Feb. 4, 1969    L. WIESNER    3,425,283
RATE GYROSCOPE
Filed Sept. 9, 1965    Sheet 1 of 2

INVENTOR.
LEO WIESNER
BY
Davis, Hoxie, Faithfull & Hapgood
ATTORNEYS.

INVENTOR.
LEO WIESNER

United States Patent Office 3,425,283
Patented Feb. 4, 1969

3,425,283
RATE GYROSCOPE
Leo Wiesner, Kew Gardens, N.Y., assignor to The United States Time Corporation, Waterbury, Conn., a corporation of Connecticut
Filed Sept. 9, 1965, Ser. No. 486,132
U.S. Cl. 74—5.6
Int. Cl. G01c 19/28
5 Claims

ABSTRACT OF THE DISCLOSURE

A rate gyroscope employs an electromagnetic pickoff system. The system includes a rotor and a stator. The stator has a plurality of poles and a primary winding on each of the poles. A first series of secondary windings is wound on even numbered poles and a second series of secondary windings is wound on odd numbered poles. The output voltages of the two series of windings are rectified by a pair of balanced semi-conductor diodes and the rectified voltages are electrically compared.

---

The present invention is directed to a rate gyroscope, and more particularly to a rate gyroscope electromagnetic pickoff system utilizing a particular form of winding pattern and a minimum of electrical components and circuitry to obtain a direct current output sensitive to degree and direction of rotation of a rotor about an output axis.

In present-day rate gyroscopes, wherein the rotational movement of a gimbal about an output axis is converted to an electrical signal representing the direction and degree of said movement, a microsyn pickoff is generally used in combination with a phase sensitive demodulator to accomplish this purpose. The pickoff system generally has four magnetic poles, or a multiple thereof, sequentially spaced around a rotor mounted on the output axis of the gyroscope, and one primary and one secondary coil are present on each pole. All of the primary coils are connected in series with each other across an alternating current source and serve to produce the magnetic flux in the system. All of the secondary coils are series connected with each other in their spatial sequence around the pickoff rotor to produce one series of secondary coils, and are each so wound on their respective poles that the non-adjacent even-numbered coils have a voltage induced therein of one polarity and the non-adjacent odd-numbered coils have a voltage induced therein of the opposite polarity. Considering the series of secondary coils as a whole, then, each coil has a voltage induced therein opposite in polarity to its adjacent coil or coils in the series.

The magnitude of the voltage induced in each secondary coil by the magnetic flux depends upon the angular position of the rotor with respect to the poles of the system. As the rotor, having offset segments, varies in position, its offset segments correspondingly cover a larger portion of half of the poles and a smaller portion of the remaining poles. Since the rotor and its offset segments form a portion of the magnetic paths between the several poles, the magnetic coupling between the several poles, and therefore the induced voltages of the secondary coils, vary as the rotor position varies. When the rotor is in its null position, its offset segments cover equal portions of each pole and equal voltages are induced in all of the secondary coils. Since half of these voltages are of one polarity, and the other half are of the opposite polarity, the resultant voltage across the total series of secondary coils is zero. As the rotor rotates from its null position, due to external forces acting on the gyroscope, the voltages induced in the secondary coils of one polarity increase and the voltages induced in the secondary coils of the opposite polarity decrease. There will then be an A.C. voltage present across the single series of secondary coils, the magnitude of which will be determined by the extent the rotor has moved, and the phase of which will be determined by the angular direction the rotor has moved in.

This total voltage across the series of secondary coils, present when the rotor is not in its null position, is passed through an input transformer to a phase-sensitive demodulator generally consisting of two alternately conducting bridges of four diodes each, four current-limiting resistors, a source of reference voltage, and a reference voltage transformer. The demodulator produces a direct current output voltage of a magnitude proportional to the magnitude of the voltage across the series of secondary coils and of a polarity determined by the phase relation between said latter voltage and the reference voltage.

The above-described present-day gyroscope pickoff system, a common form set forth by way of example, has certain disadvantages and deficiencies, in that it requires a relatively large number of electrical components, accordingly occupies a relatively large degree of space in environments such as guided missiles and other space vehicles where space is at a premium, and has significant weight due to the several components including the reference voltage and input transformers and the reference voltage source. Additionally, it requires a separate auxiliary means to individually monitor and control both the primary current and frequency of the system, and also requires delicate phasing adjustment between the phase of the reference voltage and the phase of the output from the single series of secondary coils.

It is the primary object of the present invention to overcome the above deficiencies and disadvantages of present-day gyroscope pickoff systems.

Further objects are to provide a gyroscope pickoff system which is inexpensive, which requires few components and simple circuitry, occupies less space and has less weight than present-day systems, does not require delicate phasing adjustment, and which may be utilized to monitor and control the product of primary current and frequency of the system to thereby maintain the scale factor of the pickoff constant.

The above objects are accomplished in the present invention by providing for a plurality of magnetic poles sequentially spaced around a rotor mounted for rotation about the output axis of the gyroscope as external forces act on the gyroscope, a secondary coil present on each of an even number of said poles, and primary winding means energized from an alternating current source to produce magnetic flux in the system. Each secondary coil has the same number of turns as the other individual secondary coils. The rotor, when at its null position, has offset segments covering an equal surface area of each magnetic pole of the system having a secondary coil wound thereon. As the rotor rotates in a given direction, said segments will cover a larger surface area of one-half of the number of poles having a secondary coil thereon and a smaller surface area of the remaining number of the poles having a secondary coil thereon. The secondary coils on those poles whose covered area increases as the rotor rotates in one of its two possible rotational directions, are connected together in a first series of secondary coils. The secondary coils on those poles whose covered area decreases as the rotor rotates in the same direction, are connected together in a second series of coils. The primary winding means is so wound as to produce equal flux in those poles having secondary coils when the rotor is at its null position, greater flux in those poles whose areas are increasingly covered as said rotor rotates in a given direction, and less flux in those poles whose areas are decreasingly covered as said rotor rotates in the same direction. All of the secondary coils are in turn wound on their respective poles so that the voltage induced in each coil in the first series is in phase with the voltages induced in the other coils in the first series; the voltage induced in each coil in the second series is in phase with the voltages induced in the other coils in the second series, also. When the rotor is at its null position, both secondary series produce output voltages equal in amplitude and substantially different from zero. As the rotor rotates from its null position, the output voltage from one of the series will increase linearly with the angle of rotation, and the output voltage from the other series will decrease in the same linear manner. This of course is due to the covered pole areas, and resultant magnetic coupling between the poles, varying. The total voltage outputs from each secondary series are rectified, effectively compared, and an output voltage wave is obtained having a direct current average value whose magnitude and polarity indicate the degree and direction of rotational displacement of the rotor of the gyroscope. A further computing system, for which this output voltage wave then serves as an input, is sensitive only to this direct current average value in terms of its polarity and magnitude. The rectification and effective comparison of the two secondary series output signals may be accomplished with a minimum of elements, such as by merely utilizing a pair of balanced diodes and two resistances, no phasing problems are present, and the complexity of the conventional prior art system described above is eliminated. Additionally, the two secondary series may be connected in series with each other and with their output voltages in phase with each other, to provide a constant voltage for monitoring and controlling the product of primary current and frequency of the system.

Other objects and the full nature of the present invention will be readily understood and appreciated from the following description, taken in conjunction with the accompanying drawings, wherein.

Figure 4:
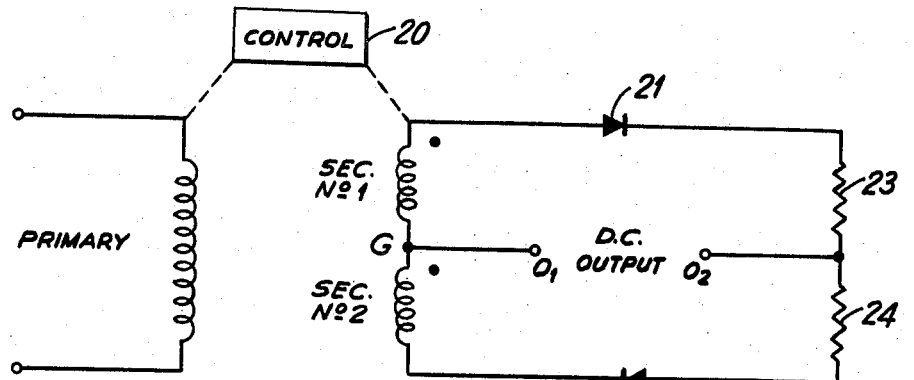
Figures 3A, 3B:
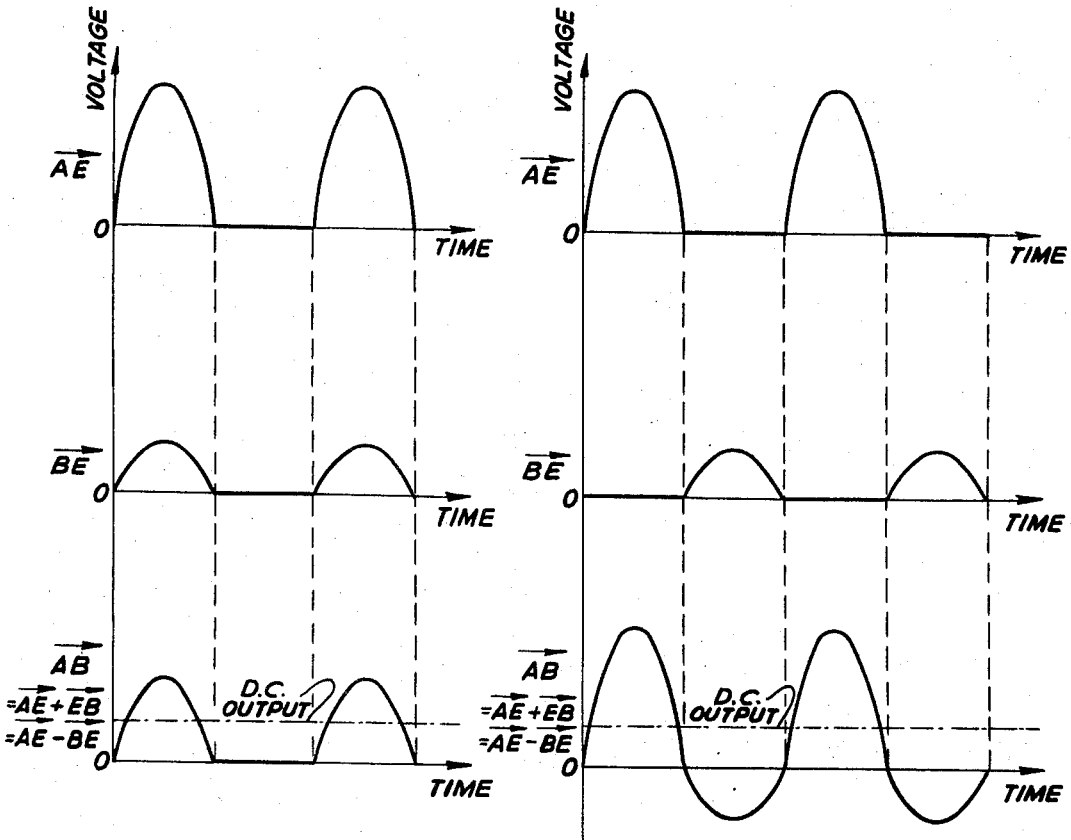

FIGURES 3a and 3b are waveform analyses of the electrical functioning of the first embodiment of the present invention, FIGURE 3a showing the result of the two secondary series output voltages being connected in out-of-phase relation with each other, and FIGURE 3b showing the result of the two secondary series output voltages being connected in-phase with each other; and FIGURE 4 is a schematic view of a second embodiment of the electrical circuitry of the present invention, additionally illustrating a means for monitoring and controlling the primary current and frequency of the pickoff system.

Figure 1:
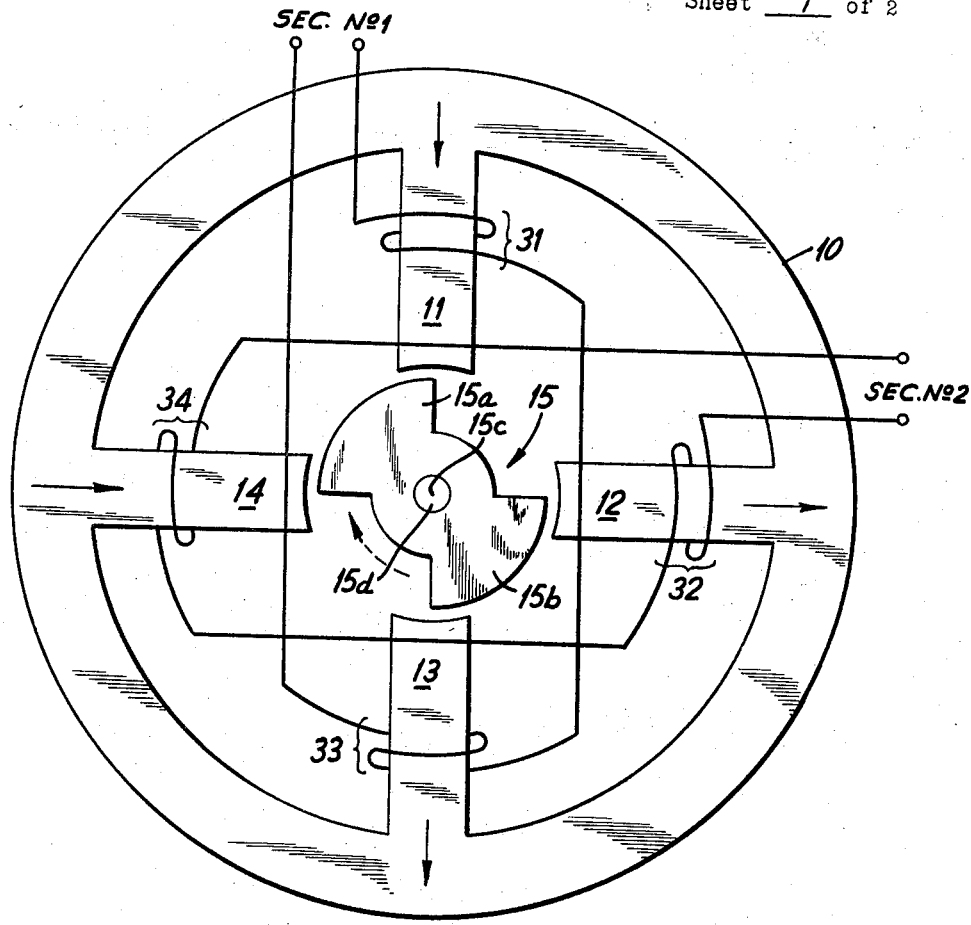
FIGURE 1 is a schematic view of the winding pattern of the two series of secondary coils in the present invention, shown in conjunction with a common form of poles and rotor structure of a gyroscope.

Referring to FIGURE 1, reference numeral 10 designates a stator having four poles 11, 12, 13, and 14, and comprised of a suitable magnetic material. The present invention may be utilized in an electromagnetic pickoff having various numbers of poles, as more fully set forth below, but a conventional four-poled system is selected by way of example. No primary coils are shown in FIGURE 1 for the sake of clarity, but it will be understood that there is one primary coil on each pole, and all primary coils are connected in series across an alternating current source. The primary coils are so wound as to produce magnetic fluxes in poles 11, 12, 13 and 14 having the instantaneous flux directions shown by the solid arrows on each pole in FIGURE 1. Rotor 15 is mounted on a shaft 15d lying along the output axis 15c of the gyroscope, the output gimbal also being connected to the other end of said shaft, and said gimbal rotating about the output axis 15c due to external forces acting on the gyroscope therefore rotates said shaft and rotor 15 mounted thereon. Pickoff rotor 15 is shown in its null position in FIGURE 1, and being comprised of magnetic material, forms a portion of the magnetic paths between the several poles. Said rotor is of course mounted within the case of the rate gyroscope, and poles 11, 12, 13 and 14 are mounted on the internal walls of said case.

Offset segments 15a and 15b of rotor 15 cover equal portions of poles 11, 12, 13 and 14 in the null position of said rotor. Assuming for the purposes of description and analysis that rotor 15 is caused to rotate about output axis 15c in the direction shown by the dotted arrow in FIGURE 1, poles 11 and 13 are increasingly covered by segments 15a and 15b, and poles 12 and 14 are decreasingly covered by said segments. Secondary coils 31 and 33, shown wound on poles 11 and 13, are connected to each other in series to form a first secondary series. These coils 31 and 33 are so wound on poles 11 and 13 as to have their induced voltages at any given instant of time in phase with each other. Likewise, secondary coils 32 and 34, shown wound on poles 12 and 14, are also connected to each other in series to form a second secondary series, and are also wound on their respective poles to have their induced voltages at any given instant of time in phase with each other. When the rotor 15 is in its null position, equal A.C. output voltages substantially different from zero are present across both series of secondary coils. As rotor 15 rotates in the indicated direction, the A.C. output voltage from the first series of secondary coils 31 and 33 increases, and the A.C. output voltage from the second series of secondary coils 33 and 34 decreases. The opposite result would follow if rotor 15 where to rotate in a direction opposite that indicated by the dotted-line arrow in FIGURE 1.

Although the above description is in terms of a four-poled stator having a primary coil and a secondary coil on each pole, stators having a multiple of four poles may of course be used. Furthermore, each primary coil may encircle more than one pole as long as equal flux is generated in all poles having secondary coils when rotor 15 is at its null position, greater flux is generated in said poles whose areas are increasingly covered as said rotor rotates in a given direction, and less flux is generated in said poles whose areas are decreasingly covered as said rotor rotates in the same direction. Stators may also be used in the present invention having only three poles or a multiple thereof. Such a three-poled stator has a primary coil wound on the middle pole, a secondary coil wound on each outside pole, and a rotor having an offset segment always completely covering the middle pole. The rotor covers equal areas of the two outside poles when the rotor is at its null position, and an increasing area of one of said outside poles and a decreasing area of the other of said outside poles as the rotor is angularly displaced in a given direction. The rotor again forms a portion of the magnetic paths between the poles, and as said rotor rotates, greater flux is produced in the pole having more of its area covered and less flux is produced in the pole having less of its area covered. The two secondary coils each have the same number of turns, and produce equal induced voltages at the null position of the rotor. As the rotor rotates, the coil on the pole increasingly covered produces an increasing voltage output and the coil on the pole decreasingly covered produces a decreasing voltage output, all in the manner described above as to the four-poled stator.

In all of the above stator and winding configurations, regardless of the number of stator poles, a secondary coil will be wound on each of an even number of poles and the rotor will cover equal areas of all poles having secondary coils thereon when the rotor is in its null position. Increasing equal areas of one-half the number of poles having secondary coils and decreasing equal areas of the other poles having secondary coils will be covered as the rotor rotates from its null position in a given direction. Equal flux will be produced in all poles having secondary coils when the rotor is at its null position, and greater and less flux respectively will be produced in those poles whose areas are increasingly and decreasingly covered as the rotor rotates in a given direction. All the secondary coils will have the same number of turns, a first secondary series will be formed of all secondary coils on those poles whose areas are increasingly covered, and a second secondary series will be formed of all secondary coils on those poles whose areas are decreasingly covered. All the coils in the first series will be wound to have their induced voltage in phase with each other at a given instant of time, all the coils in the second series will be wound to have their induced voltage in phase with each other at a given instant of time, and both series will produce equal output voltages different from zero at the null position of the rotor. One of the series will produce a voltage output increasing substantially linearly with the angle that the rotor rotates through in moving from its null position, and the other of said series will produce a voltage output decreasing substantially linearly with the angle that the rotor rotates through in moving from its null position.

Figure 2:
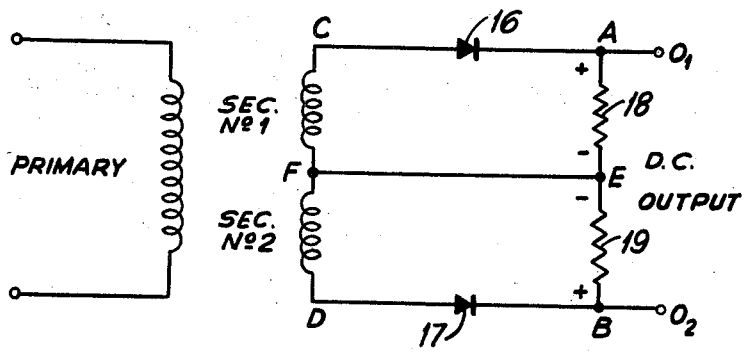
FIGURE 2 is a schematic view of a first embodiment of the electrical circuitry of the present invention.

Turning to FIGURE 2, the two secondary series derived as described above are further shown connected in series with each other. As will be described below, said two series may be connected in either series-aiding or series-opposing relation, and the associated electrical circuit of FIGURE 2 is the same for both cases. The A.C. output voltages from each series are respectively separately rectified by one and the other of a pair of balanced semiconductor diodes 16 and 17, which are balanced with each other over the operating temperature range of the pickoff, and rectified voltages $\overrightarrow{AE}$ and $\overrightarrow{BE}$ are produced across equal resistances 18 and 19. The A.C. output voltages should be generally sufficiently high so that the pair of balanced diodes 16 and 17 operate well above the "knee" of their characteristic curve, thereby providing desired excellent linearity. The pair of balanced diodes may be of the type purchased under the designation "General Electric IN 4306." The particular circuitry described and shown results in rectified voltage drops $\overrightarrow{AE}$ and $\overrightarrow{BE}$ being opposed to each other, and the resultant output voltage $\overrightarrow{AB}$ equal to voltages $\overrightarrow{AE}-\overrightarrow{BE}$ has an average D.C. value over one cycle of A.C. input voltage which indicates by its polarity and magnitude the direction and amount that rotor 15 has been angularly displaced. The two half-wave rectifier circuits shown in FIGURE 2 may of course be replaced by full-wave rectifiers or voltage doubling circuits.

The functioning of the above-described circuit will be understood by a consideration of the waveform analyses shown in FIGURES 3a and 3b. FIGURE 3a is representative of the two secondary series, CF and FD, being connected in series-opposing relation, and FIGURE 3b represents the two series being connected in series-aiding relation. FIGURES 3a and 3b are both representative of rotor 15 having been roated in the direction indicated in FIGURE 1, whereby rectified voltage $\overrightarrow{AE}$ from the first secondary series is considerably larger than rectified voltage $\overrightarrow{BE}$ from the second secondary series. Opposing rectified voltage $\overrightarrow{AE}$ and $\overrightarrow{BE}$ are combined to produce output voltage $\overrightarrow{AB}=\overrightarrow{AE}+\overrightarrow{EB}=\overrightarrow{AE}-\overrightarrow{BE}$, said resultant output voltage having an average D.C. component over one cycle of A.C. input voltage whose value and polarity are indicative of the functioning of rotor 15. If rotor 15 had rotated in the opposite direction from that indicated, rectified voltage $\overrightarrow{BE}$ would then be larger than rectified voltage $\overrightarrow{AE}$ and the resultant average D.C. component of voltage $\overrightarrow{AB}$ over one cycle of A.C. voltage would be of the opposite polarity. The amount that rotor 15 rotates determines the difference in magnitude between voltages $\overrightarrow{AE}$ and $\overrightarrow{BE}$, and since these voltages are combined to oppose each other, this difference is reflected in the magnitude of the average D.C. component of the resultant voltage $\overrightarrow{AB}$ over one cycle. When the two series of secondary coils are connected in series-opposing relation (FIG. 3a), diodes 16 and 17 conduct at the same instant of time. When said series are connected in series-aiding relation (FIG. 3b), diodes 16 and 17 alternately conduct. In either case, the average D.C. component of output voltage $\overrightarrow{AB}$ over one cycle of A.C. input voltage is the same in value, and this signal is equivalent to the signal provided by the conventional phase sensitive demodulator described above in terms of the prior art.

FIGURE 4 illustrates an alternate embodiment of the electrical circuitry of the present invention, and achieves the same result as the circuitry shown in FIG. 2. The two secondary series previously defined above must here be connected to each other in series-aiding relationship in the embodiment of FIG. 4. The A.C. output voltages from the two series are rectified by the pair of balanced semiconductor diodes 21 and 22 connected as shown, said diodes being balanced with each other over the operating temperature range of the pickoff, and the resulting rectified voltages are dropped across resistances 23 and 24 to yield a voltage across points $O_1$–$O_2$ having an average D.C. value over one cycle of A.C. input voltage which indicates by its polarity and magnitude the direction and amount that rotor 15 has been angularly displaced. Again, the A.C. output voltages from the two secondary series should be generally sufficiently high so that diodes 21 and 22 operate well above the "knee" of the characteristic curve to provide linearity. The nature of diodes 21 and 22 is described above in reference to FIG. 2. Resistances 23 and 24 should also be equal in value for the circuit to provide the desired output voltage between points $O_1$–$O_2$, and the circuit functions best when the output load impedance between points $O_1$–$O_2$ is large compared to resistances 23 and 24. This alternate circuit of FIGURE 4 is particularly useful when it is desired to ground point G common to the two secondary series.

As an example of the functioning of the circuit of FIGURE 4 to provide said described voltage between points $O_1$–$O_2$, it may be seen that during the half cycle of A.C. output voltage from the two secondary series that both diodes 21 and 22 are conducting, the total rectified voltage will appear as equal voltage drops across resistance 23 and 24. If the A.C. voltages from each series are not equal, indicating rotor 15 has rotated from its null position, a voltage drop of a given polarity will exist across points $O_1$–$O_2$ whose polarity is determined by the direction rotor 15 has rotated in and whose average D.C. value is determined by the magnitude of the swing of rotor 15. If the voltage across the first secondary series is larger than the voltage across the second secondary series, point $O_2$ is positive with respect to point $O_1$; if the relative magnitudes of the two secondary series voltages are reversed, point $O_2$ is negative with respect to point $O_1$. If rotor 15 is in its null position, the A.C. voltages from each series are equal and no voltage appears across points $O_1$–$O_2$. During the opposite half cycle of A.C. voltages from the two series, regardless of the magnitudes of the respective series voltages, neither diode 21 or diode 22 conducts and no voltage occurs between points $O_1$–$O_2$, since the output load impedance between points $O_1$–$O_2$ is low compared to the impedance across diodes 21 and 22 which are essentially open circuited.

It will also be recognized that other circuits may also be designed to provide the same result as those circuits described in reference to FIGURES 2 and 4. In any case, said circuit means will compare the A.C. voltages from the two secondary series with each other as to difference in magnitudes and as to which voltage is larger, and provide an output signal having a D.C. average value whose magnitude and polarity is dependent on said two factors compared. The output signal is then passed to a further computing system which is sensitive only to magnitude and polarity of said D.C. average value and is essentially insensitive to the A.C. ripple.

FIGURE 4 is also shown to include a schematic representation of a servo control 20 connected between the primary winding means and the two secondary series of the pickoff. The servo control 20 may equally well be used in the exact same manner in the FIGURE 2 circuit, and serves the function of monitoring and controlling the primary excitation of the pickoff system. Servo control 20 is only of value when the two secondary series are connected to each other in series-aiding relationship, in which instance the voltage across both said series is independent of the position of rotor 15. At the null position of rotor 15, the voltage generated by the first secondary series is equal to the voltage generated by the second secondary series. As rotor 15 rotates, the voltage from one of these series increases and the voltage from the other series decreases; the total voltage across both series remains the same. When the two secondary series are connected in series-opposing relationship, however, the total voltage across both series is not a constant value. The scale factor of a pickoff such as described above, this factor being the output voltage from the pickoff for a unit angle through which rotor 15 rotates, is proportional to the product of the frequency and magnitude of the pickoff primary winding current. If the pickoff is to provide an output signal which accurately indicates the angle rotor 15 has rotated through, the product of primary current and frequency must therefore be kept constant. To monitor and control this product by a servo control, there must be a signal present proportional to this product and therefore independent of the position of rotor 15. Prior pickoffs have had their single series of secondary coils producing a signal dependent on the position of the rotor, and therefore required a separate auxiliary means which monitored and maintained the primary current and frequency constant individually, rather than monitoring and maintaining the product constant. Since, in the present invention, the two secondary series combined produce a signal independent of rotor position and proportional to said product when the two secondary series are connected in series-aiding relationship, no such prior monitoring and controlling means is required. Servo control 20, operated by said combined secondary series signal, may be used to control either primary current or pickoff frequency, since the control of one of said factors can be used to compensate for variations in either factor and keep the product constant. Any conventional form of servo loop control may be used for this purpose.

Although the above invention has been described in reference to a rate gyroscope, it will be recognized that the principles are equally applicable to an integrating gyroscope or an accelerometer wherein the inertia element takes the place of the rotor described above.

While the present invention has been illustrated and described in detail in terms of its objects, functioning and apparatus, it is not intended to be limited to the details shown, since various modifications and changes may be made without departing in any way from the spirit and scope of the invention as hereinafter claimed.

What is claimed is:

1. A rate gyroscope including a case;
a rotor mounted within the case for rotation about its axis in response to external forces acting on the gyroscope;
a plurality of magnetic poles mounted on the case and spaced around the circumference of said rotor;
a secondary coil wound on each of an even number of said poles;
said rotor covering equal areas of all of said poles having secondary coils when the rotor is at its null position, and respectively covering increasing equal areas of one-half the number of said poles and decreasing equal areas of the other half the number of said poles as the rotor rotates from its null position;
primary winding means energized from an alternating current source generating a flux pattern to produce equal flux in those poles having secondary coils when the rotor is at its null position, said means producing greater flux in those poles whose areas are increasingly covered and less flux in those poles whose areas are decreasingly covered as said rotor rotates;
all of said secondary coils having the same number of turns;
a first secondary series formed by directly connecting to each other the secondary coils on said poles which are increasingly covered by said rotor when the rotor is rotated in a given direction;
a second secondary series formed by directly connecting to each other the secondary coils on said poles which are decreasingly covered by said rotor when the rotor is rotated in the same direction;
all of said coils in said first series being so wound on their respective poles as to have their induced voltages in phase with each other at any given instant of time;
all of said coils in said second series being so wound on their respective poles as to have their induced voltages in phase with each other at any given instant of time;
both series producing equal output voltages at the null position of the rotor;
one of said series producing a voltage output increasing in a substantially linear manner with the angle that said rotor rotates through in moving from its null position;
the other of said series producing a voltage output decreasing in a substantially linear manner with the angle that said rotor rotates through in moving from its null position; and
circuit means connected to the outputs of said first and second series to effectively compare the output voltages from said two series with each other as to difference in magnitude and as to which of said voltages is larger, said circuit means providing an output signal having an average direct current value, over one cycle of alternating current input voltage, whose magnitude is dependent on said difference and whose polarity is dependent on which of said voltages is larger, said circuit means comprising a pair of balanced semi-conductor diodes and connected thereto a plurality of resistances;
wherein said two series are connected to each other, one of said diodes and a first resistance are connected in series across said first series, the other diode and a second resistance are connected in series across said second series, said balanced diodes are polarized so that the current in either series will not flow in the other series, and said output signal from said circuit means is produced across said two resistances.

2. The invention defined in claim 1, wherein said two series are connected to each other in series-additive relationship.

3. The invention defined in claim 1, wherein said two series are connected to each other in series-opposing relationship.

4. A rate gyroscope including a case;
a rotor mounted within the case for rotation about its axis in response to external forces acting on the gyroscope;
a plurality of magnetic poles mounted on the case and spaced around the circumference of said rotor;
a secondary coil wound on each of an even number of said poles;
said rotor covering equal areas of all of said poles having secondary coils when the rotor is at its null position, and respectively covering increasing equal areas of one-half the number of said poles and decreasing equal areas of the other half the number of said poles as the rotor rotates from its null position;

primary winding means energized from an alternating current source generating a flux pattern to produce equal flux in those poles having secondary coils when the rotor is at its null position, said means producing greater flux in those poles whose areas are increasingly covered and less flux in those poles whose areas are decreasingly covered as said rotor rotates;

all of said secondary coils having the same number of turns;

a first secondary series formed by directly connecting to each other the secondary coils on said poles which are increasingly covered by said rotor when the rotor is rotated in a given direction;

a second secondary series formed by directly connecting to each other the secondary coils on said poles which are decreasingly covered by said rotor when the rotor is rotated in the same direction;

all of said coils in said first series being so wound on their respective poles as to have their induced voltages in phase with each other at any given instant of time;

all of said coils in said second series being so wound on their respective poles as to have their induced voltages in phase with each other at any given instant of time;

both series producing equal output voltages at the null position of the rotor;

one of said series producing a voltage output increasing in a substantially linear manner with the angle so that said rotor rotates through in moving from its null position;

the other of said series producing a voltage output decreasing in a substantially linear manner with the angle that said rotor rotates through in moving from its null position; and circuit means connected to the outputs of said first and second series to effectively compare the output voltages from said two series with each other as to difference in magnitude and as to which of said voltages is larger, said circuit means providing an output signal having an average direct current value, over one cycle of alternating current input voltage, whose magnitude is dependent on said difference and whose polarity is dependent on which of said voltages is larger, said circuit means comprising a pair of balanced semi-conductor diodes and connected thereto a plurality of resistances, wherein said two series are connected to each other in series-additive relationship, said circuit means includes said first diode, two equal resistances and said second diode connected in series with each other across said two series, said diodes are polarized to conduct in the same direction, and said output signal from said circuit means is produced between the interconnection of said two series of secondary coils and the interconnection between said two equal resistances.

5. A rate gyroscope including a case;

a rotor mounted within the case for rotation about its axis in response to external forces acting on the gyroscope;

a plurality of magnetic poles mounted on the case and spaced around the circumference of said rotor;

a secondary coil wound on each of an even number of said poles;

said rotor covering equal areas of all of said poles having secondary coils when the rotor is at its null position, and respectively covering increasing equal areas of one-half the number of said poles and decreasing equal areas of the other half the number of said poles as the rotor rotates from its null position;

primary winding means energized from an alternating current source generating a flux pattern to produce equal flux in those poles having secondary coils when the rotor is at its null position, said means producing greater flux in those poles whose areas are increasingly covered and less flux in those poles whose areas are decreasingly covered as said rotor rotates;

all of said secondary coils having the same number of turns;

a first secondary series formed by directly connecting to each other the secondary coils on said poles which are increasingly covered by said rotor when the rotor is rotated in a given direction;

a second secondary series formed by directly connecting to each other the secondary coils on said poles which are decreasingly covered by said rotor when the rotor is rotated in the same direction;

all of said coils in said first series being so wound on their respective poles as to have their induced voltages in phase with each other at any given instant of time;

all of said coils in said second series being so wound on their respective poles as to have their induced voltages in phase with each other at any given instant of time;

both series producing equal output voltages at the null position of the rotor;

one of said series producing a voltage output increasing in a substantially linear manner with the angle that said rotor rotates through in moving from its null position;

the other of said series producing a voltage output decreasing in a substantially linear manner with the angle that said rotor rotates through in moving from its null position; and circuit means connected to the outputs of said first and second series to effectively compare the output voltages from said two series with each other as to difference in magnitude and as to which of said voltages is larger, said circuit means providing an output signal having an average direct current value, over one cycle of alternating current input voltage, whose magnitude is dependent on said difference and whose polarity is dependent on which of said voltages is larger, said circuit means comprising a pair of balanced semi-conductor diodes and connected thereto a plurality of resistances;

wherein said two series are connected to each other in series-additive relationship, a servo control is connected between said two secondary series and said primary winding means, and said servo control is operated by the combined output of said two secondary series to control the product of the primary winding means frequency and current.

References Cited

UNITED STATES PATENTS

| | | | |
|---|---|---|---|
| 2,488,734 | 11/1949 | Mueller | 74—5.6 X |
| 2,752,791 | 7/1956 | Jerosh et al. | 74—5.6 |
| 2,842,749 | 7/1958 | Bonnell | 336—135 |
| 2,847,664 | 8/1958 | Lewis | 74—5.6 X |
| 2,868,023 | 1/1959 | Bonnell | 74—5.6 |
| 2,925,590 | 2/1960 | Boltinghouse et al. | 74—5.6 X |

C. J. HUSAR, *Primary Examiner.*